United States Patent [19]
Papen

[11] 3,779,277
[45] Dec. 18, 1973

[54] ANTI-DIRT SLEEVE FOR ISOSTATIC PRESS

[75] Inventor: Eduard L. J. Papen, Belsele, Belgium

[73] Assignee: National Forge Company, Irvine, Pa.

[22] Filed: Feb. 29, 1972

[21] Appl. No.: 230,306

[52] U.S. Cl.................... 137/592, 277/205, 425/405
[51] Int. Cl............................ F16j 15/48, B29c 3/04
[58] Field of Search.................... 137/590, 592, 544, 137/546, 547, 548, 549; 220/20, DIG. 42 B; 277/23, 73, 205, 212; 425/405

[56] References Cited
UNITED STATES PATENTS

| 3,133,132 | 5/1964 | Loeb et al. | 277/23 X |
| 3,477,096 | 11/1969 | Bowles et al. | 425/405 |
| 3,588,080 | 6/1971 | Wallick | 425/405 |
| 3,664,801 | 5/1972 | Martrier | 425/405 |

*Primary Examiner*—William R. Cline
*Attorney*—Ronald F. Ball

[57] ABSTRACT

A disc of elastomeric material to catch falling particles and prevent them from abrading the bottom seal of a pressure vessel. The disc has an outer edge which is turned up to form a pan of circular shape and is dimensioned to make a close fit to the inside wall of a pressure vessel.

8 Claims, 2 Drawing Figures

PATENTED DEC 18 1973 3,779,277

3,779,277

ANTI-DIRT SLEEVE FOR ISOSTATIC PRESS

BACKGROUND OF THE INVENTION

The invention relates to a device for protecting the bottom closure seals of pressure vessels from abrasive particles which are heavier than the fluid within the vessel.

In certain isostatic pressing operations, particles of the material being pressed get into the fluid contained within the high pressure cylinder used as the press chamber. These particles enter the system principally as the result of inadequate cleaning of the outside of the mould after filling, by air borne contamination of the general work area, and by the inadvertent rupture of the elastic mould during an isostatic pressing cycle.

These particles, in many cases, are extremely abrasive and, being heavier than the fluid, collect in the bottom of the pressure vessel. One common type of pressure vessel has a closure fitted to the bottom with an "O" ring type high pressure seal. In these vessels the abrasive particles contact the "O" ring seal which moves axially slightly each time the vessel is pressurized. Repeated usage thus abrades the seal and the seal area of the pressure vessel, causing premature leakage and failure.

SUMMARY OF THE INVENTION

A preferred embodiment of the present invention comprises an elastomeric disc whose outer edge is turned upwardly to form a pan of circular shape. The outer surface of the turned up edge is adapted to make a close fit to the inside wall of a pressure vessel so that particles settling from the pressure fluid are trapped in the pan and prevented from abrading the seal of the bottom closure of the pressure vessel. One or more vertically extending, hollow standpipes are provided in the disc to permit pressure equalization on both sides of the disc. One or more of the standpipes have fluid passageways located in such a manner as to protect the vessel seal from settling particles.

It is therefore an object of the present invention to provide a device for entrapping abrasive particles which settle out of the fluid contained within a pressure vessel and to prevent them from abrading the bottom seal of the pressure vessel, causing premature failure.

The foregoing and other objectives, features, and advantages of the invention will be more readily understood upon consideration of the following detailed description of a preferred embodiment of the invention, taken in conjunction with the accompanying drawings.

DESCRIPTION OF THE PREFERRED EMBODIMENT

Figure 1:
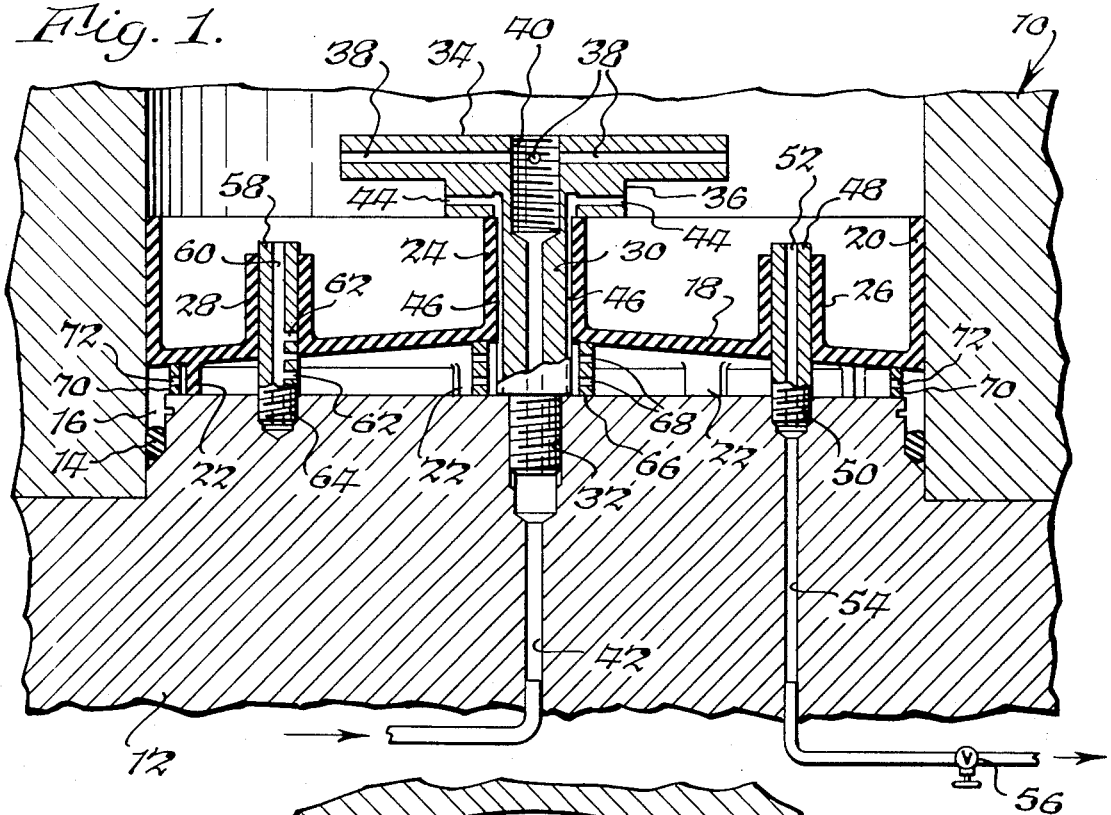
FIG. 1 is a vertical sectional view of a preferred embodiment of the invention together with a portion of a typical pressure vessel within which the invention is designed to be placed.
Figure 2:
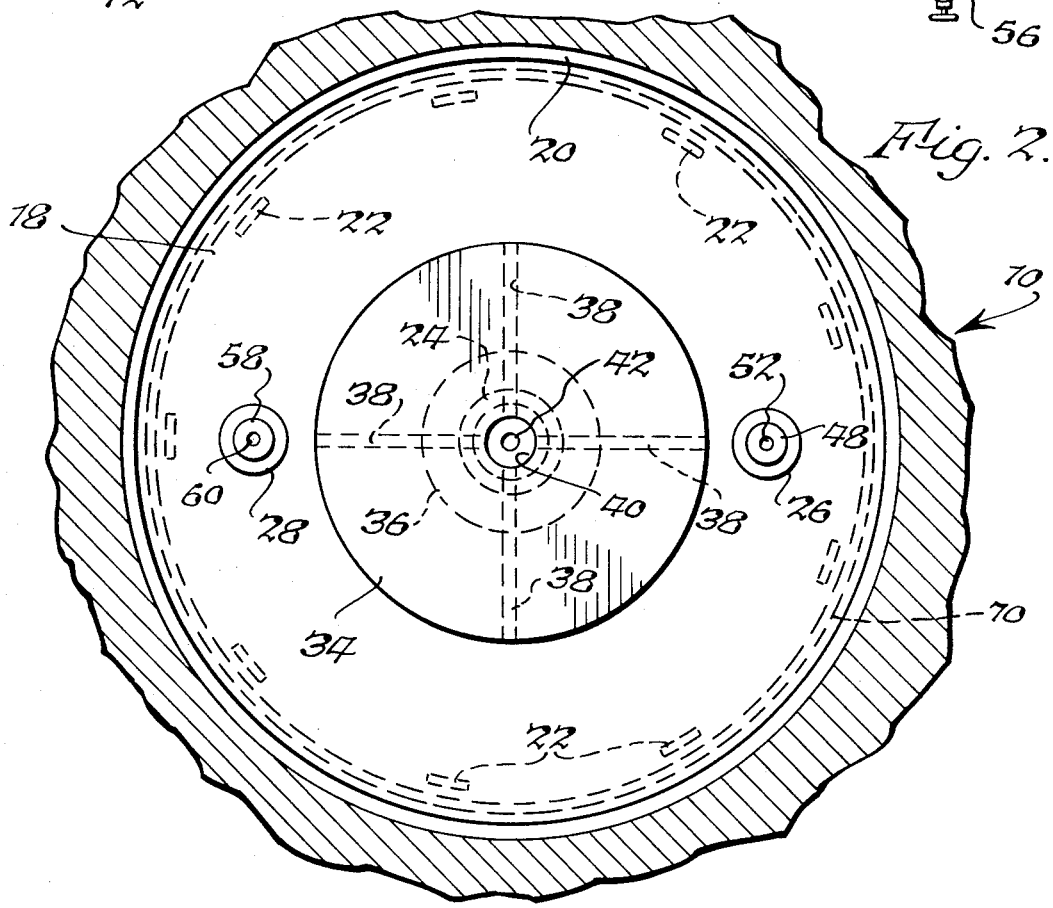
FIG. 2 is a plan view of the embodiment of FIG. 1.

Referring now more particularly to FIG. 1 a portion of a hollow cylindrical pressure vessel body 10 is illustrated together with a typical bottom plug type closure 12 fitted into the open bottom end of the pressure vessel 10. An O-ring seal 14 is nested within a recess 16 in the outer upper circumferential edge of the closure plug 12. The purpose of the seal 14 is to prevent the escape of fluid during pressurization between the vessel body wall 10 and the closure plug 12. During pressurization and depressurization the closure plug 12 and the seal 14 move axially due to the elasticity of the external framework (not shown) which holds the plug 12 in place.

Resting on top of the closure plug 12 is a disc 18 made of elastomeric material such as rubber. The diameter of the disc 18 is substantially the same as the diameter of the closure plug 12. The outer periphery of the disc 18 has an upturned edge 20 which abuts the interior surface of the wall of the pressure vessel 10.

The disc 18 is supported on the plug 12 by a plurality of vertically extending legs 22 placed about its underside and near its periphery. The legs 22 are arranged on the underside of the disc 18 so as not to be in contact with the O-ring seal 14. A hollow projection 24 extends upwardly from the center of the top surface of the disc 18. Two other hollow projections 26 and 28, respectively, extend upwardly from the top surface of the disc 18 at locations spaced radially inward from the outer periphery of the disc 18.

A standpipe 30 is supported in the projection 24 so that a lower portion of the standpipe 30 extends downwardly through the undersurface of the disc 18 and seats in a recess 32 in the closure plug 12. The upper portion 34 of the standpipe 30 is enlarged in diameter and extends outwardly from the top of the projection 24. A groove 36 in the base of the enlarged portion 34 causes it to overhang the upper surface of the disc 18. A plurality of bores 38 extend radially through the portion 34 of the standpipe 30. The bores 38 communicate with a vertically oriented passage 40 in the center of the standpipe 30 which extends from the top to the bottom surfaces of the standpipe 30. A passage 42 in the closure plug 12 extends from the recess 32 to the exterior of the pressure vessel and is in communication with the passage 40.

The passage 42 is also connected to an external source of fluid not shown which fills the vessel with fluid through the passage 40. A plurality of radial, horizontal bores 44 in the grooved portion 36 of the standpipe 30 communicate with a plurality of vertical bores 46 which extend downwardly to communicate with the area beneath the undersurface of the disc 18. Together the bores 44 and 46 provide a passageway from the interior of the vessel above the disc 18 to the underside of the disc 18 to allow both fluid and air pressure to equalize on either side of the disc 18.

A second standpipe 48 is fitted within the projection 26 so that its upper portion extends above the upper surface of the disc 18. The lower portion of the standpipe 48 is seated in a recess 50 in the closure plug 12. A vertical bore 52 in the standpipe 48 provides fluid communication between the upper surface of the disc 18 and a bore 54 which extends through the closure plug 12 from the recess 50 to the exterior of the pressure vessel where it connects with a decompression valve 56. The lower portion of the standpipe 48 is sealed in the recess 50 so that there is no direct fluid communication between the bore 52 and the undersurface of the disc 18. The bore 52 and the bore 54 allow the pressure vessel to be emptied of fluid after the pressing cycle.

A third standpipe 58 is fitted in the projection 28 so that its upper portion extends vertically from the top of the projection 28. The standpipe 58 has a vertical bore 60 which extends from its top to connect with a plurality of horizontal side bores 62 which exit from that portion of the standpipe 58 beneath the undersurface of the disc 18. The base of the standpipe 58 is fitted into a recess 64 in the closure plug 12. Together the bores 60 and 62 provide a pressure equalization passageway between the underside of the disc 18 and the interior of the vessel above the disc 18.

In practice, fluid is pumped into the vessel through the passageways 40 and 42. Air trapped beneath the undersurface of the disc 18 exits through the bores 44 and 46 in the standpipe 30. The fluid pressure is equalized through the bores 60 and 62 in the standpipe 58. The arrangement of the standpipes and their passageways is such that particles suspended in the fluid do not settle out near the O-ring seal 14 but instead deposit primarily on the upper surface of the disc 18. What few particles do reach the undersurface of the disc 18 through the bores in the standpipes deposit near the center of the uppersurface of the closure plug 12. When the vessel is emptied through the bore 52 in the standpipe 48 and the bore 54 in the closure plug 12 fluid beneath the underside of the disc 18 escapes through the bores 60 and 62 in the standpipe 58 and the bores 44 and 46 in the standpipe 30. Any particles trapped within these bores are forced out by the escaping fluid.

In large vessels it may be necessary to use a rigid support ring 66 around the base of the standpipe 34 beneath the undersurface of the disc 18. The ring 66 has a plurality of holes 68 to allow equalization of pressure. A second rigid ring 70 extends around the outer periphery of the underside of the disc 18 exterior and adjacent to the supporting legs 22. The ring 70 also has a plurality of pressure equalizing holes 72.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A device for entrapping dirt in a hollow cylindrically shaped isostatic pressure vessel of the type having a bottom opening, a bottom closure for the opening and a resilient seal between the bottom closure and the interior wall of the vessel, said dirt entrapping device comprising a disc having an upper and lower surface, means for equalizing fluid pressure between the upper and lower surfaces of said disc, said disc being supported above said seal and having an annular upturned portion at the periphery thereof of a diameter substantially the same as the internal diameter of the vessel, whereby said upturned portion makes a close fit with the interior wall surface of the pressure vessel and preventing thereby said dirt from reaching said seal.

2. A dirt entrapping device as recited in claim 1 wherein said disc is supported on said bottom closure by supporting legs integral with said disc and protruding from the lower surface thereof, and said disc is predeterminedly oriented in relation to said bottom closure by at least one standpipe seated in a recess in said bottom closure.

3. A dirt entrapping device as recited in claim 2 wherein said disc is formed with an upstanding hollow projection to receive said one standpipe.

4. A dirt entrapping device as recited in claim 3 wherein said one standpipe extends from the lower surface of said disc through said projection to project above the upper surface of the disc, said one standpipe having a lower portion below the lower surface of the disc and an interior passage for providing fluid from an external source into said pressure vessel above said disc.

5. A dirt entrapping device as recited in claim 4 wherein said one standpipe has a second interior passage between the upper end of said one standpipe and the exterior surface of the lower portion of said one standpipe for equalizing the fluid pressure between the lower and upper surfaces of the disc.

6. A dirt entrapping device as recited in claim 4 comprising a second standpipe extending from below the lower surface of said disc through said disc to a level above the upper surface of said disc, said second standpipe having an interior passage and openings for equalizing the fluid pressure between the upper and lower surfaces of said disc.

7. A dirt entrapping device as recited in claim 6 comprising a third standpipe extending from below the lower surface of said disc through said disc to a level above the upper surface of said disc, said third standpipe having an internal passage communicating at one end with the interior of the pressure vessel above said disc and at its other end with conduit means for exhausting fluid from said vessel, said internal passage being sealed against communication between the upper and lower surfaces of said disc.

8. A dirt entrapping device as recited in claim 1 wherein said disc is of elastomeric material.

* * * * *